(12) United States Patent
Khmelev et al.

(10) Patent No.: US 12,154,118 B1
(45) Date of Patent: Nov. 26, 2024

(54) SYSTEM AND METHOD FOR ENHANCED CUSTOMER SUPPORT EXPERIENCES

(71) Applicant: UIPCO, LLC, San Antonio, TX (US)

(72) Inventors: Yevgeniy Viatcheslavovich Khmelev, San Antonio, TX (US); Robert Andrew Massie, San Antonio, TX (US); David Campbell, San Antonio, TX (US); Gregory Brian Meyer, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 139 days.

(21) Appl. No.: 17/651,944

(22) Filed: Feb. 22, 2022

Related U.S. Application Data (60) Provisional application No. 63/154,471, filed on Feb. 26, 2021.

(51) Int. Cl.
*G06Q 30/016* (2023.01)

(52) U.S. Cl.
CPC .................. *G06Q 30/016* (2013.01)

(58) Field of Classification Search
CPC .................................................. G06Q 30/016
See application file for complete search history.

(56) References Cited

U.S. PATENT DOCUMENTS

| | | | |
|---|---|---|---|
| 9,171,294 B2 * | 10/2015 | Dutta | H04L 65/1069 |
| 10,891,629 B1 * | 1/2021 | Barakat | H04M 3/493 |
| 2018/0131810 A1 * | 5/2018 | Yokel | H04M 3/5233 |
| 2019/0182383 A1 * | 6/2019 | Shaev | G06Q 30/016 |
| 2020/0160351 A1 * | 5/2020 | Veggalam | H04M 3/5175 |

\* cited by examiner

*Primary Examiner* — Florian M Zeender
*Assistant Examiner* — Emily M. Kraisinger
(74) *Attorney, Agent, or Firm* — Plumsea Law Group, LLC (57) ABSTRACT

A method and system of providing customer-specific information and guidance to support agents during calls with customers. The information includes a summary of in-app activity by the customer prior to the call between the customer and a support agent. The method includes receiving and storing the in-app activity in an activity record associated with the customer's account. The activity record is retrieved in response to a communication session being initiated or occurring between the customer and support agent and presented to the support agent in order to facilitate the conversation and expedite the resolution process.

20 Claims, 10 Drawing Sheets

SYSTEM AND METHOD FOR ENHANCED CUSTOMER SUPPORT EXPERIENCES

CROSS-REFERENCE TO RELATED APPLICATION

This application claims the benefit of U.S. Provisional Patent Application Ser. No. 63/154,471 filed on Feb. 26, 2021 and titled "System and Method for Enhanced Customer Support Experiences", the disclosure of which is incorporated by reference in its entirety.

TECHNICAL FIELD

The present disclosure generally relates to a system and method of providing information to end-users, and more specifically to offering real-time customized information and guidance to a customer support agent during calls with clients.

BACKGROUND

Customer support and information centers, or call centers, are commonly set up by government agencies, organizations, and business operations to handle customer inquiries and to provide support for their products and services. For example, a customer support center may be a location with a few persons who handle incoming and outgoing customer calls. For larger organizations, the support center may be a dedicated facility with a large group of support personnel with advanced computers and telecommunication equipment, where the employees make calls and receive incoming customer inquiries. In some cases, a support center may handle customer calls concerning the repair or maintenance of their goods or services, or to otherwise interact with their customers. There are a wide range of applications that facilitate the activities of the support centers, including sales applications, such as order entry and reservation applications, financial services applications, including funds transfer and stock transactions, and customer service applications, including technical support, repair and claims handling.

However, while such remote communication and support centers are less expensive to operate, customers often describe such interactions as tedious and repetitive, and are generally rated lower in customer satisfaction. Customers typically make several attempts to address their issue on their own prior to contacting a support center. Customers then find the process of explaining the details of their problem unnecessarily time-consuming and draining. The interaction can also be challenging if a customer cannot clearly describe the issue or if the support agent is not able to immediately understand the issue. In cases where the issue must be forwarded to another team member, the process of having to again explain the issue becomes frustrating and can deter customers from seeking help and/or from feeling satisfied with their products and/or service experience.

There is a need in the art for a system and method that addresses the shortcomings discussed above.

SUMMARY

In one aspect, a method for facilitating customer support experiences by presenting customer-specific information to a support agent includes a first step of receiving, via an application, a first input from a first customer, and a second step of storing at least the first input in a customer database as a first activity record. In addition, the method includes a third step of accessing, in response to a request for a communication session between the first customer and a support agent, the first activity record, and a fourth step of presenting, at a computing device for the support agent, a first report including data from the first activity record.

In another aspect, a method for providing customer-specific intelligent recommendations to a support agent includes a first step of receiving, via an application, a first input from a first customer describing a first issue for which a solution is being sought, and a second step of storing at least the first input in a customer database as a first activity record. The method further includes a third step of determining, via an intelligent recommendation model, at least a first recommended solution to the first issue based in part on data from the first activity record, and a fourth step of presenting the first recommended solution at a computing device for a support agent in response to a request for a communication session between the first customer and a support agent.

In another aspect, a system for presenting customer-specific information to a support agent, the system comprising a processor and machine-readable media including instructions which, when executed by the processor, cause the processor to receive, via an application, a first input from a first customer, and store at least the first input in a customer database as a first activity record. The instructions further cause the processor to access, in response to a request for a communication session between the first customer and a support agent, the first activity record, and then present, at a computing device for the support agent, a first report including data from the first activity record.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a system and method for facilitating conversations between a support agent and a customer by the presentation of the customer's past in-app activity to the support agent. Specifically, the embodiments provide a system and method for conveying information to a customer service representative describing the issue(s) and/or queries that the customer is attempting to resolve by tracking the customer's most recent in-app activity prior to the conversation. The service representative may be at a location that is remote relative to the customer's location, such as a call center, or may be interacting with the customer in person. As will be discussed in greater detail below, the proposed systems and methods facilitate interactions with a customer by presentation of a report to the agent that includes a summary of the virtual actions taken by the customer, and any inputs provided in-app by said customer. Traditionally, when the customer is connected to a support agent, the customer is obliged to provide a detailed description of their problem or query, as well as specifications for the product and/or service that is the subject of the call. As will be discussed in greater detail herein, the proposed embodiments allow the customer to enjoy the convenience of communicating with a support agent who is already familiar with their issue, and is aware of the steps the customer has already taken in trying to address the issue. In some embodiments, the support agent may also be able to access various options and smart recommendations that have not yet been accessed or executed by the customer to expedite the resolution process.

As used herein, the term "customer" should be understood tor refer to any end-user or person requesting or receiving assistance or other communications from a support agent. It should be understood that while the following description presents a sequence of examples illustrating the use of the proposed systems and methods in a customer-agent dynamic, in other embodiments, the proposed systems may be utilized by a broad range of end-users, including other types of work calls and corporate calls. For example, there are many occasions in which an employee is working on a project and needs guidance from a supervisor. By making use of this type of system, the employee can permit access to the supervisor to a summary of their attempts to resolve the issue, enriching the communication between them and expediting any resolution.

Figure 1:
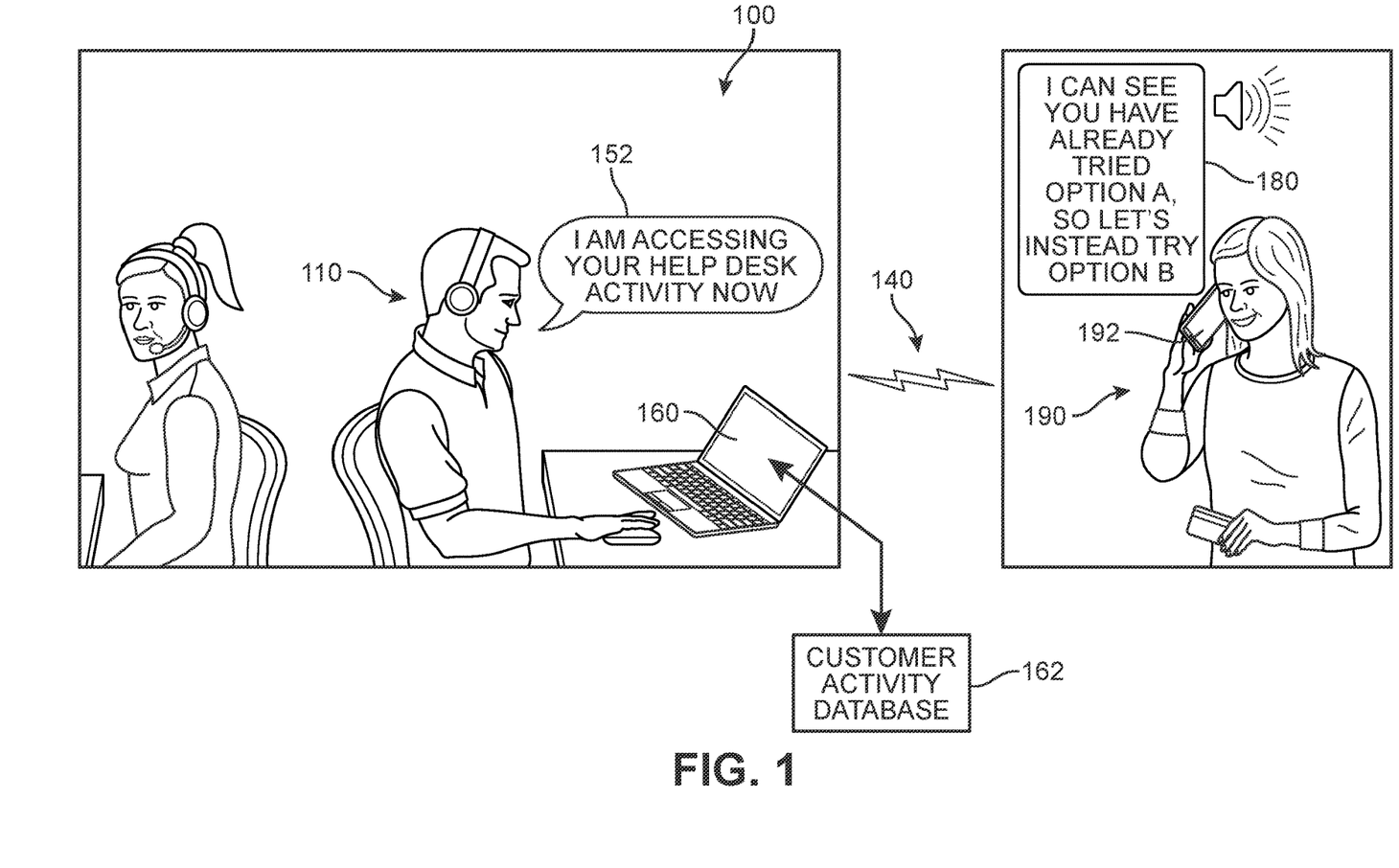
FIG. 1 is an illustration of an example of a support agent providing guidance to a customer, according to an embodiment.

Referring now to FIG. 1, for purposes of introduction, a first agent 110 employing a customer reporting system is shown seated at a call center 100. The first agent is interacting with a first customer 190 via a first computing device ("first device") 160 and headset, and is has accessed a report generated using information stored in a customer activity database 162. As a general matter, the first device 160 can include an electronics unit comprising a plurality of different components, such as a user interface component (e.g., a touchscreen display, keyboard, mouse, speakers, etc.), a user interface module, a processor, and/or a communication module. For purposes of this example, first device 160 can be a desktop computer, laptop, tablet, or other computing device configured for connection to a network. In some embodiments, the customer reporting system is available at least in part as a local resource stored on the first device 160, while in other embodiments, some or all features of the system are made available via a remote cloud service.

Furthermore, the first device 160 includes one or more processors and memory. Memory may comprise a non-transitory computer readable medium. Instructions stored within memory may be executed by the one or more processors. A communication module may allow the first device 160 to communicate wirelessly. In different embodiments, the first device 160 may communicate with a mobile computing device, wireless devices, and/or with networked computers, for example over the internet. In this case, the communication module is a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, first customer 190 can participate in the communication session via a telephone or a computing device configured with a network connection, depending on the mechanism utilized for data transmission. In other embodiments, the exchange may occur in person. In this case the first customer 190 is speaking and listening to the call via a mobile phone (computing) device 192. However, in other embodiments, no computing device is necessary to implement the disclosed systems, and a traditional telephone service may be used by the customer or other listener. A customer may contact or be contacted by a support agent or other service representative to learn more about a service or product, obtain guidance or help, or purchase various items. For purposes of this example, the first customer 190 has just been connected to support agent 110.

Before the call occurred, the first customer 190 had attempted to resolve their issue using an app associated with the service and/or products that are supported by employees of call center 100. The information inputted into the app by first customer 190 and any other transactions that took place over a pre-specified duration before the call have been stored in the customer activity database 162. The duration can vary. For example, in some embodiments, all past transactions may be recorded, while in other embodiments, only the most recent app activity is stored. In another embodiment, in-app activity may be stored for a specific duration (e.g., one day, one week, one month, etc.) and then deleted. In some cases, only a specific number of the most recent app sessions will be stored. Prior to the call or once the call is initiated, the support agent 110 is able to view a report summarizing the recent activity. In this case, the support agent 110 indicates to the customer in a first utterance 152 that "I am accessing your help desk activity now", where the help desk activity refers to the customer's in-app activity, followed by a second utterance 180 that "I can see you have already tried Option A, so let's instead try Option B." In this scenario, there is no burden on the customer to explain their issue or what actions they have already undertaken, nor is there the loss of time and mental energy by the customer in providing a sequence of inputs regarding their product/service and its usage. Instead, this information is automatically generated and presented to the support agent 110, allowing him to quickly grasp the essentials of the issue and move directly toward providing the customer with a resolution. Such a system can also reduce the likelihood of errors by support agent 110 in identifying the problem and understanding the customer's concerns. This type of interaction is far more convenient for both parties and can greatly enhance the communication experience.

Figure 2:
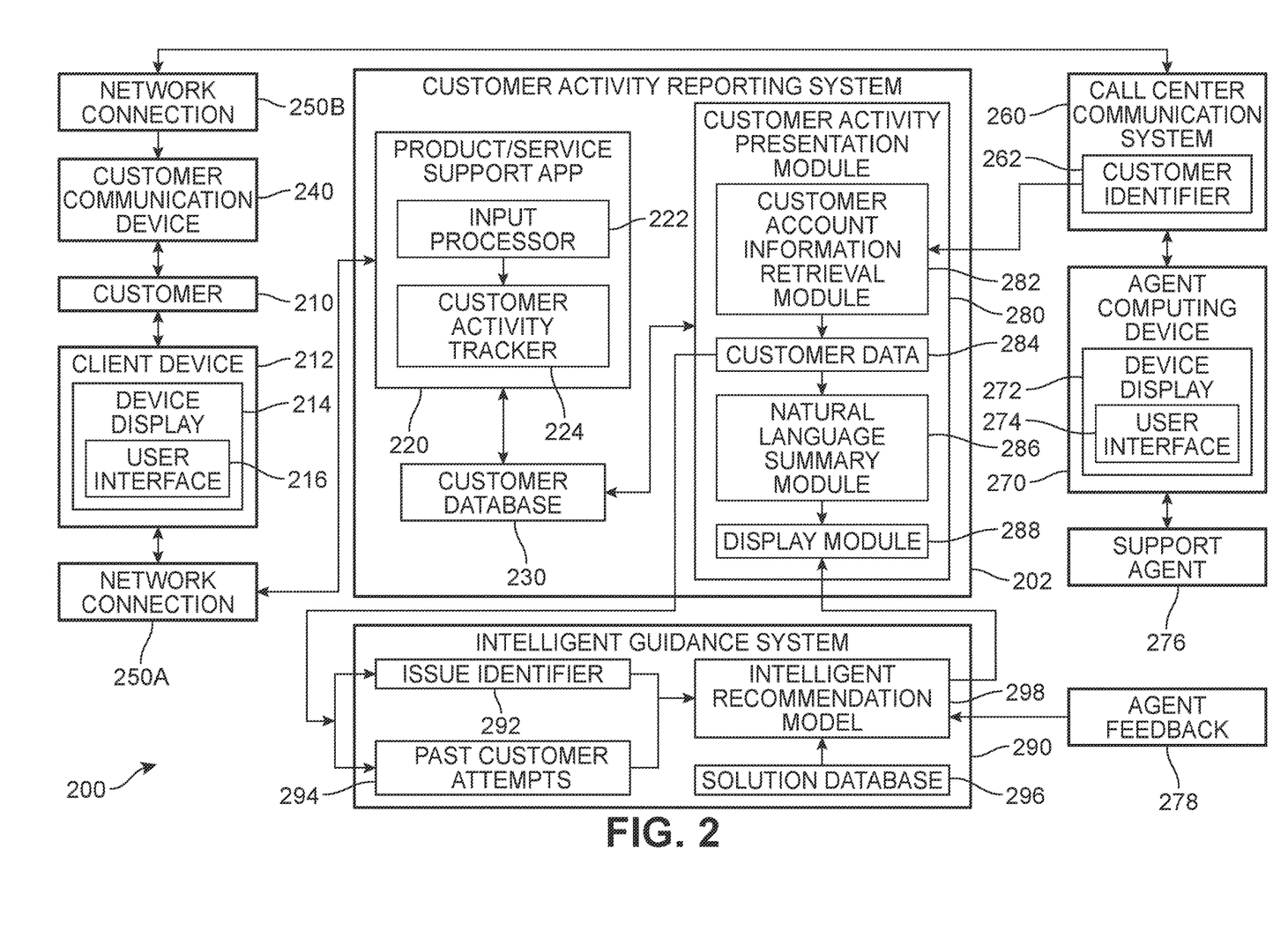
FIG. 2 is a schematic diagram of a system for automatically providing guidance to a customer support agent, according to an embodiment.

In order to provide the reader with a greater appreciation of the embodiments, FIG. 2 depicts an overview of an embodiment of an enhanced customer support environment ("environment") 200 in which customer activity is tracked and presented to a support agent when needed via a customer activity reporting system ("reporting system") 202. In addition, as noted above, in some embodiments, the environment 200 includes an intelligent guidance system ("guidance system") 290 configured to provide customized recommendations to the support agent in order to improve and expedite the issue resolution experience.

As shown in FIG. 2, the environment 200 includes a client computing device ("client device") 212, a customer communication device 240 that are configured to communicate with an agent computing device ("agent device") 270, for example via a Wi-Fi, cellular, or other network connections 250a and 250b. While the various components of environment 200 are shown as being accessed through a cloud network and/or stored on a cloud-based server in FIG. 2, in other embodiments some or all components described herein can be reside in client device 212 and/or agent computing device 270.

In different embodiments, the client device 212 includes a device display ("display") 214 that can present information and media for a product/service support software application ("app") 220 that is associated with the provider of the product/service of interest to customer 210. For example, the customer 210 can receive and send information through a user interface 216 that may be presented on the device display 214. The user interface 216 and display 214 may represent a common component or may represent separate physical or functional components. In some embodiments, display 214 may be a touchscreen, allowing the customer to interact with the user interface directly by touch. The user interface may refer to an operating system user interface or the interface of one or more software applications that may run on the client device 212. In addition, when the customer launches a support application on client device 212, they may be shown an option to initiate a screen sharing function, whereby content currently being displayed on the client device 212 is transmitted to the agent computing device 270. In some embodiments, the user interface 216 can include a messaging window or other chat-space by which the support agent 270 may send text messages or other digital content. Alternatively, in some embodiments, the customer 210 can also speak with the support agent 270 via a voice calling application on client device 212, or directly through a telephone or other external device, such as customer communication device 240.

Although not shown in FIG. 2, it should be understood that a support agent 276 can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 270 can be connected to or include an internet customer interface for providing support specifically to customers or members who contact them via the Internet. As a general matter, support agent 276 can refer to any person or personnel who offers the caller (or person who was called) assistance, and has access to the reporting system 202 and/or guidance system 290 during the communication session with the customer.

In different embodiments, the customer 210 may, upon encountering a concern, query, problem, or other issue with a product or service associated with the company, organization, or other entity employing environment 200, attempt to address the issue via app 220. The app 220 can represent an interactive platform that provides a site from which the customer can create and maintain an account, access information and options related to the entity and its products or services, review and/or modify their account details, and/or communicate with personnel of entity. For example, the customer 210 can enter various inputs via client device 212 that are received by an input processor 222 of the app 220. In some embodiments, the app 220 will generate a log of these inputs and selections via a customer activity tracker ("tracker") 224. In other embodiments, the tracker 224 may be a component that is external to app 220. The tracker 224 will be in communication with a customer database 230 that will store the information as a short or long-term record associated with the customer's account. In some embodiments, the tracker 224 can be configured to automatically transfer the data in real or near real-time to the customer database 230, upon the completion of a specific task by the customer, and/or in response to the customer's request for assistance from a support agent.

In cases where the customer 210 is unable to resolve their issue via the app 220, has further questions or concerns about their issue, or is otherwise unsatisfied with the app's recommended solutions, he or she may request contact with a live support agent. This communication session may be initiated directly by the customer 210 (e.g., via a telephone number, an in-app chat or videoconference) or the customer 210 may ask that a support agent initiate the communication session from their end (see FIG. 5). Once a request for a communication session has been received, the reporting system 202 can be configured to automatically generate a summary of the customer's most recent in-app activity and/or in-app activity that has been logged as being related to the reason for the call to the support agent 276.

For example, as shown in FIG. 2, when a call center communication system 260 receives such a request by a customer, it may identify the account associated with the customer ("customer identifier") 262. This information is provided to customer activity presentation module ("presentation module") 280, causing a customer account information retrieval module 282 to access the recent or related activity from the customer database 230 for the account associated with the customer identifier 262. The relevant information is received by the presentation module 280 as customer data 284, which is optionally formatted to natural language by a natural language understanding (NLU) processing and generation system summary module 286. For example, in cases where the customer data 284 is stored in symbols or other non-dialogue text, the NLU system can convert the data into a natural language response via a language generation module. For example, a language generation module may receive input comprising customer data 284 and output a string of words that is more easily reviewed and understood by support agent 276. In other embodiments, the customer data 284 can be unaltered. The information is then shared with a display module 288 that is accessible by the support agent 276 via device display 272.

As noted earlier, in different embodiments, the environment 200 can further include guidance system 290. The guidance system 290 is configured to receive customer data 284 as input for an intelligent recommendation machine learning model ("model") 298. In some embodiments, the customer data 284 can be segregated or otherwise classified for use by the model 298 to include specific types of information, such as the issue (via an issue identifier 292) and the solutions already attempted by the customer, if any (via a past customer attempts identifier 294). These and other aspects of the customer data 284 are used by the model 298 to determine whether there is a solution(s) or process that is more likely to result in a successful outcome for the customer that has not yet been attempted or may be attempted via a different mechanism or process. In some embodiments, the model 298 can be configured to connect to a solution database 296 that includes a repository of common issues and their corresponding suggested solutions. Based on the information available, the model 298 can determine if there are one or more solutions that could be applicable, and transmit this information to presentation module 280. These intelligent recommended insights and actions can then be automatically presented to the support agent 276, for example via user interface 274. The support agent 276 can then choose to implement or offer the suggested tool or action with the customer. In some embodiments, the support agent 276 may be able to disregard the first recommendation and ask the system to generate an alternative next-best option.

In addition, in some embodiments, the model 298 can be configured to learn over time. In some embodiments, the model 298 can receive agent feedback 278 directly from support agent 276 (i.e., as manual input) and/or automatically via agent device 270 upon termination of the communication session. For example, if the issue was successfully resolved using the recommended solution generated by the model 298, the model is reinforced. If the recommended solution was ineffective, the model can reassess the value of that recommendation for future instances of the same issue. In addition, if a solution was successfully implemented that was different from the recommendation, the model can incorporate this as a new option for similar cases. In different embodiments, the model 298 can also have access to an electronic repository of previous communication sessions/customer records. The records can have a wide range of session knowledge elements, including but not limited to whether the outcome of the session was deemed successful (i.e., positive outcome), or unsuccessful (i.e., negative outcome), the issue(s) addressed, the solutions attempted, etc. In some embodiments, the feedback may alternatively or additionally be provided by the customer as input to the model.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors. In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 3:
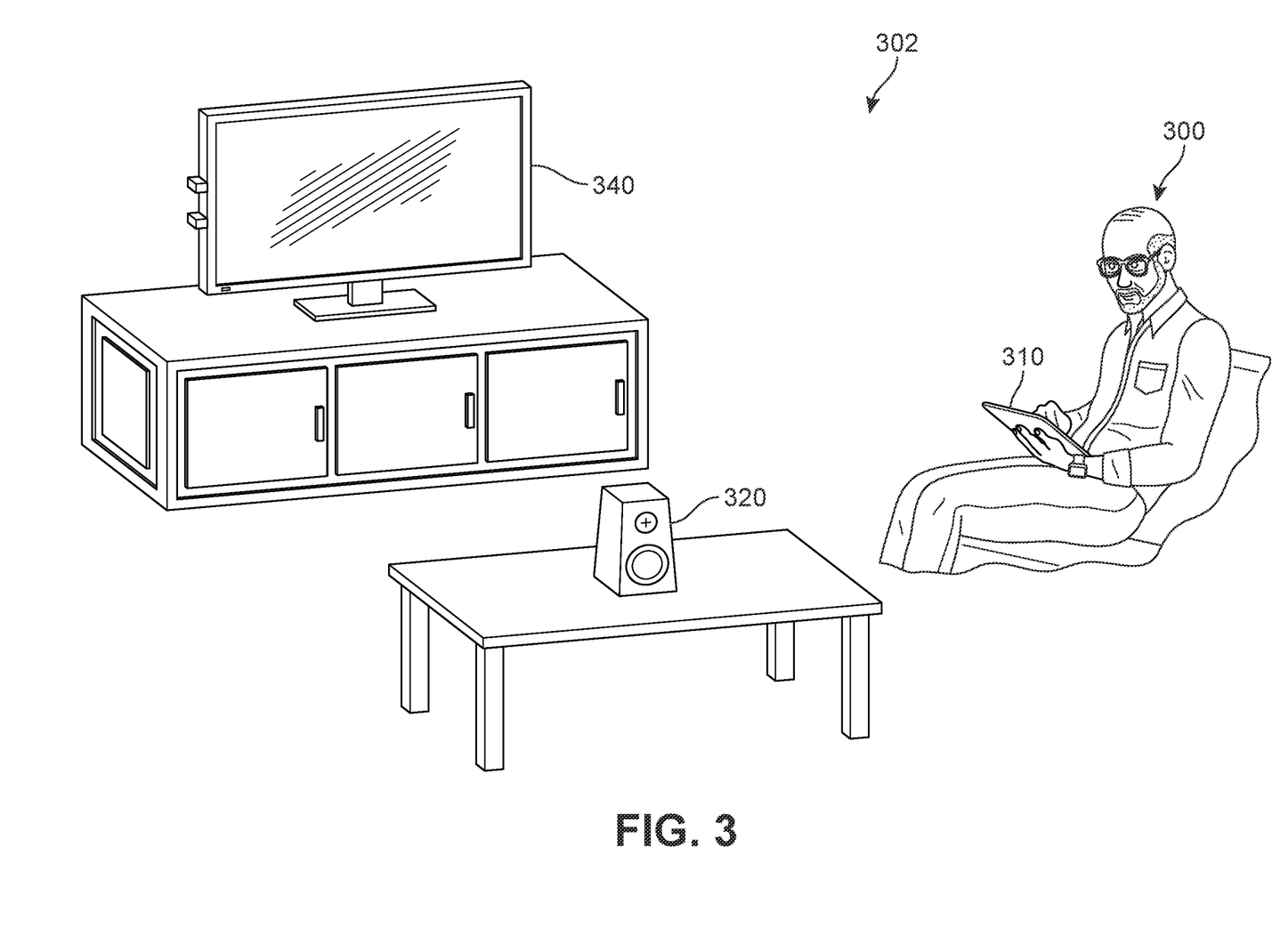
FIG. 3 is an illustration of a customer attempting to diagnose a product issue at their home, according to an embodiment.

Referring now to FIGS. 3-8, a sequence of drawings illustrates one example of a use of an enhanced customer support system ("system"). In FIG. 3, a second customer 300 is depicted at a first time seated on a sofa 304 in a living room space 302 while reading an instruction manual via a computing device 310 (in this case, a tablet touchscreen device). For purposes of this example, the second customer 300 is attempting to connect a nearby smart speaker system ("speaker") 320 to his nearby television 340. At this time, second customer 300 has been thus far unsuccessful in his attempts, and is navigating an app for an entity that is associated with the television 340 and/or speaker 320 to troubleshoot and learn more about the desired process. This is more directly illustrated in FIGS. 4 and 5, where an example of an app 410 providing product/service information and support is depicted.

Figure 4:
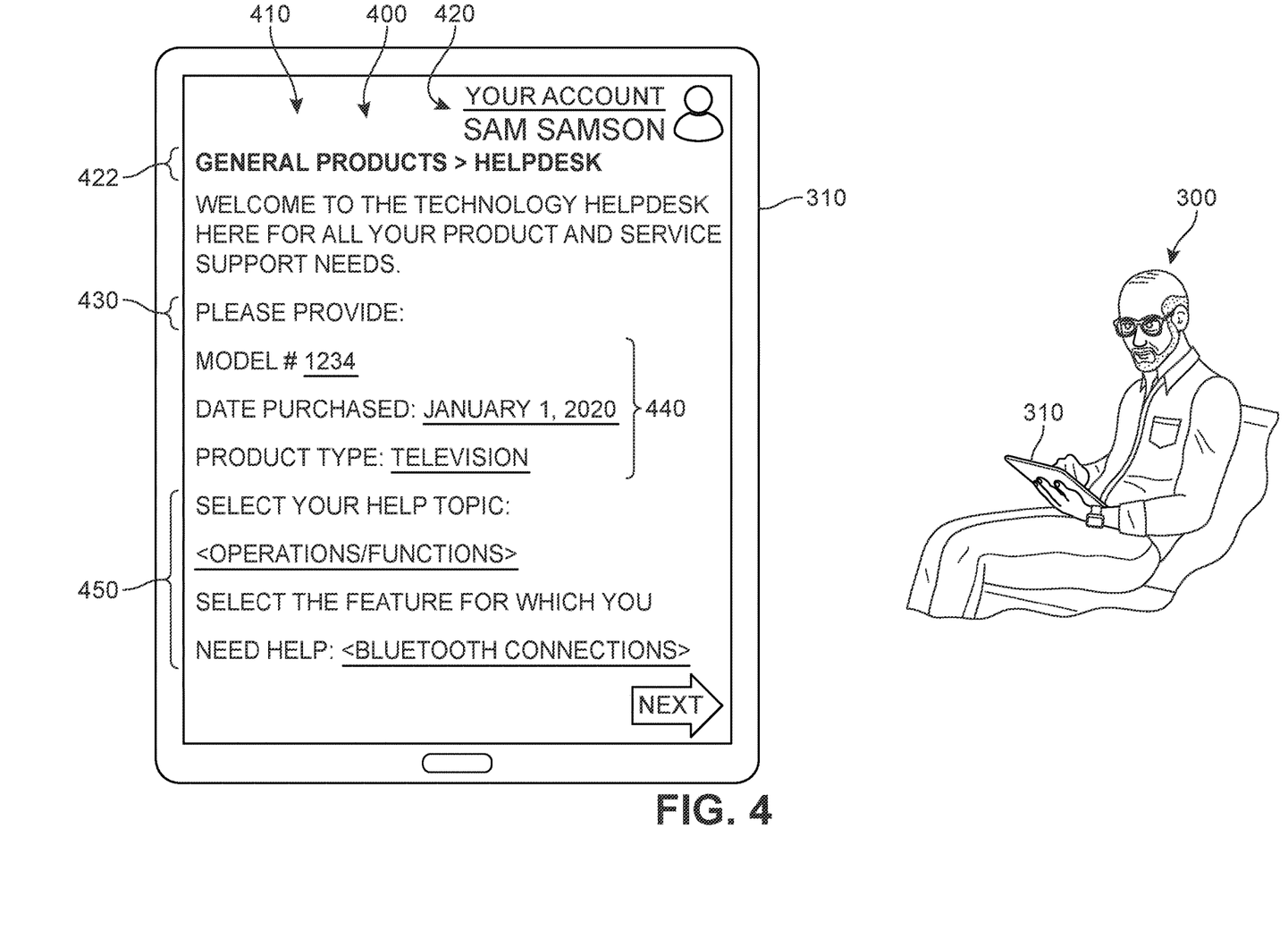
FIGS. 4 and 5 are an illustration of the customer of FIG. 3 attempting to troubleshoot the product issue by reference to a product support application, according to an embodiment.

In FIG. 4, the second customer 300 is shown interacting with a first account, as indicated by an account header 420 ("Your Account/Sam Samson"). During this current app usage session, second customer 300 has navigated from a main page to General Products menu and then to a Helpdesk page (with message "Welcome to the technology helpdesk, here for all your product and service support needs"), as indicated by a navigation header 422. In order for the app to determine what information should be offered to the second customer 300, first page 400 includes an intake form (e.g., "Please provide: Model #1234, Date Purchased: Jan. 1, 2020, Product Type: Television") via which the user can submit the details of the product or service for which he is requesting assistance or information. In some embodiments, the app may prompt the customer for additional types of input 450, such as the general subject or topic describing their issue (e.g., "Select your help topic: <Operations/Functions>") and/or the specific aspect that is important to the customer (e.g., "Select the feature for which your need help: <Bluetooth Connections>").

In other embodiments, the app can present further or alternate options for enabling the user to further describe their problem, question, concern, or other reason for which they are accessing the app. In some embodiments, the user may identify purchase information of the product/service (for example, price paid, date of purchase, condition of item at the time of purchase, etc.), product information (for example, brand, model or serial number, dimensions, warranty information, etc.) as well as other kinds of information regarding the product/service or user himself/herself that might be pertinent to resolution of the issue.

Figure 5:
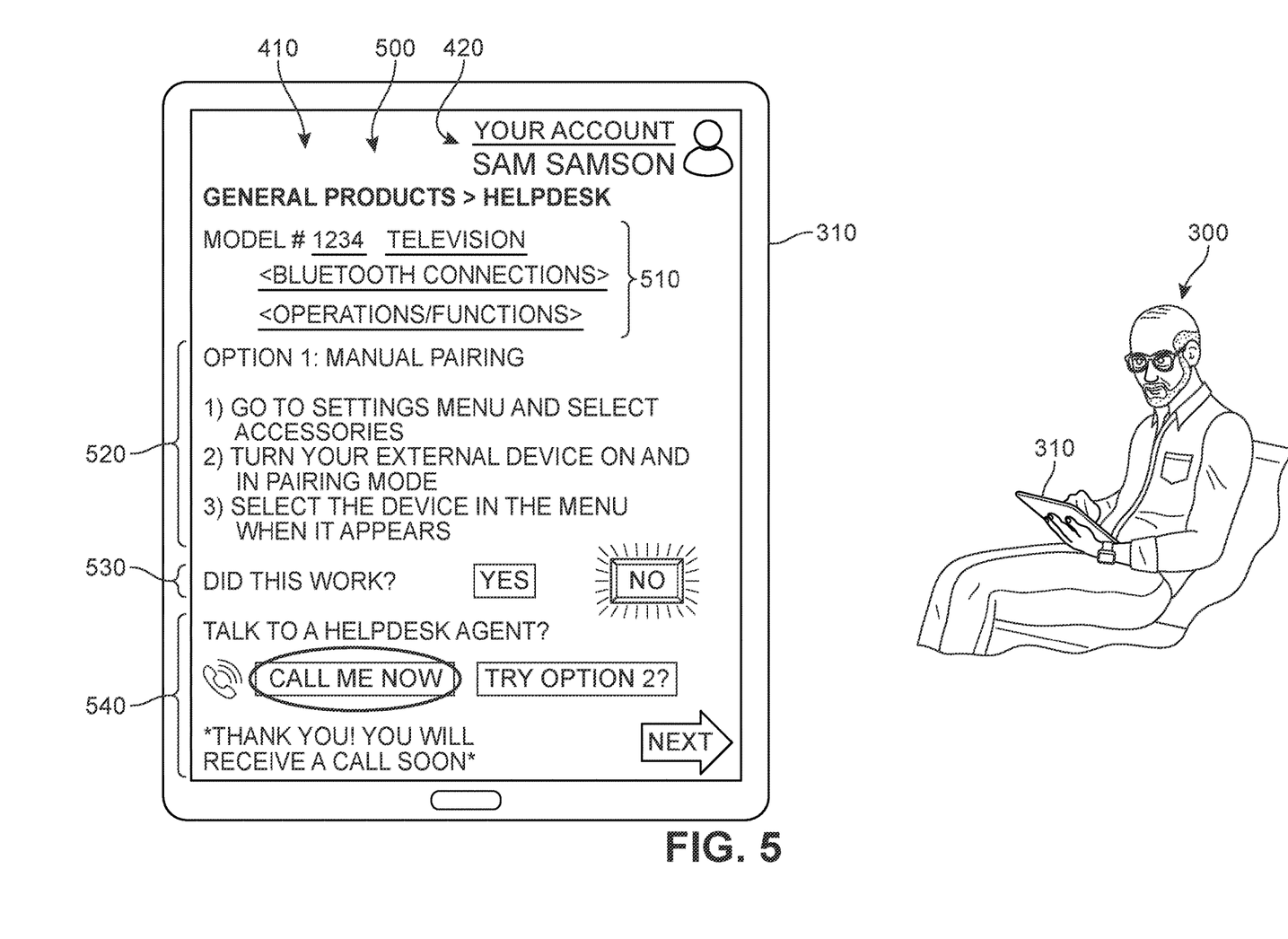

As shown in FIG. 5, once this information has been entered, the second customer 300 then moves to a second page 500. The app 410 presents a summary 510 of the information he has provided, as well as a recommended solution 520 to his issue (e.g., "Option 1: Manual pairing: 1) Go to settings menu and select accessories; 2) Turn your external device on and in pairing mode; 3) select the device in the menu when it appears"). Below the solution 520, the app 410 requests feedback 530 (e.g., asking if this approach worked, etc.). When the user selects "No", the app 410 presents alternative approaches 549, such as a call with a support agent (e.g., "Talk to a helpdesk agent?") or accessing other solution options (e.g., "Try option 2?"). The second customer 300 decides to reach out to a support agent and selects the "Call me now" selectable option and is told "Thank you! You will receive a call soon".

Figure 6:
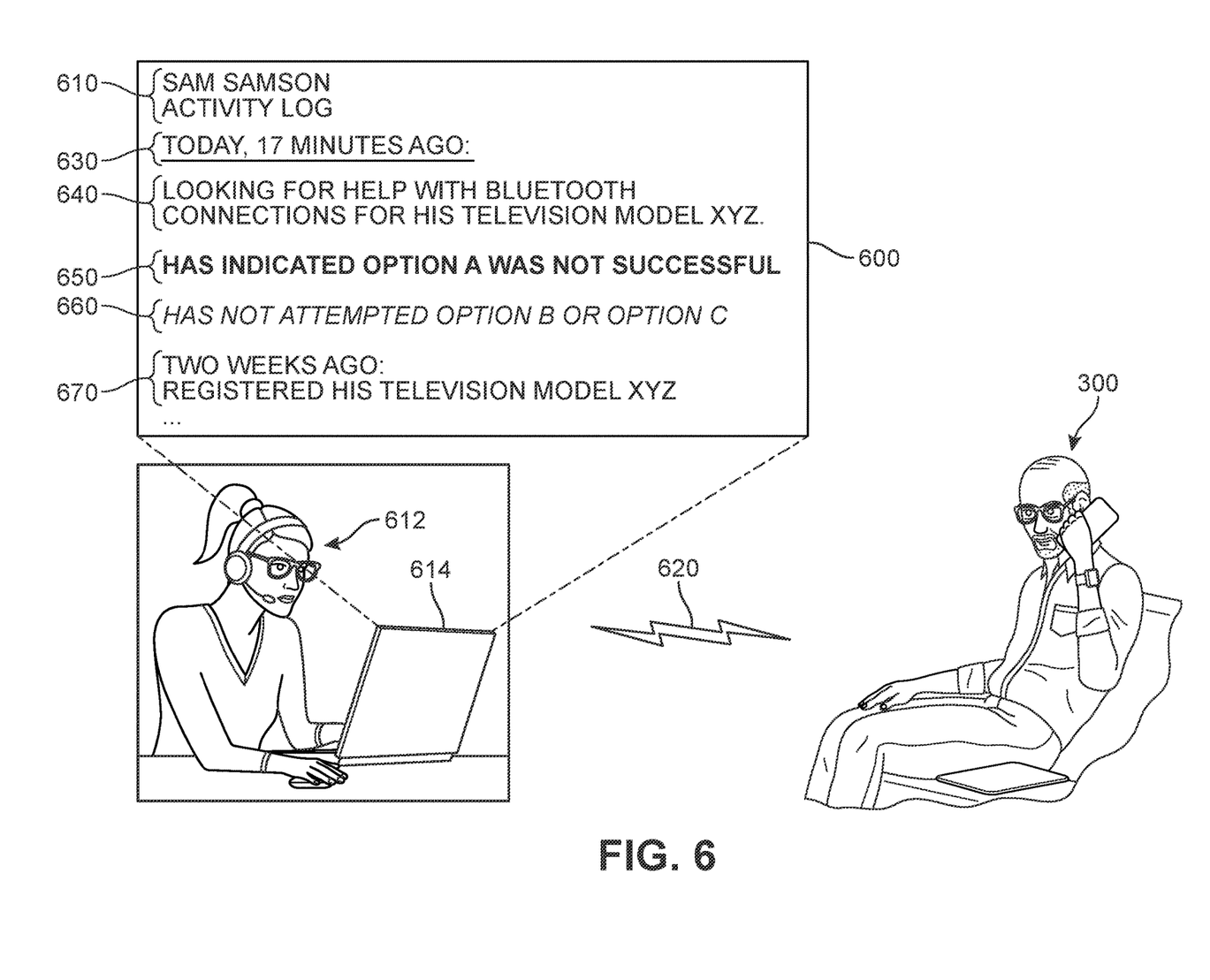
FIG. 6 is an illustration of a customer connecting to a support center, where the support agent has access to the customer's recent activity, according to an embodiment.

In different embodiments, the customer can instead initiate the call himself via telephone, or submit a message via an in-app communication platform. In some embodiments, the second customer 300 can transmit a request to initiate a communication session to a customer support center via a web application or tele/video conferencing application. Referring to FIG. 6, a support representative 612 is illustrated participating in a communication session 629 with second customer 300 via telephone at a second time that is subsequent to the first time during which the second customer 300 interacted with app. Prior to and/or during the communication session, as discussed with reference to FIG. 2, the support representative 612, via computing device 614, is able to access a customer activity report ("report") 600 for second customer 300 based on the customer account identifier received earlier either via the app itself or more directly from the customer prior to or during the call.

In this example, the report 600 includes the customer account name 610, and a time reference 630 (e.g., "Today, 17 minutes ago") indicating how long ago the activity occurred. The report 600 further includes a quick overview 640 of the customer's issue (e.g., "Looking for help with Bluetooth connections for his television model XYZ"), a solution summary 650 (e.g., "Has indicated Option A was not successful"), and untried recommended approaches 660 (e.g., "Has not attempted Option B or Option C"). In some embodiments, the report 600 can also include information or past activity 670 for the customer from earlier points in time, particularly those determined to be related to the current issue (e.g., "Two weeks ago: registered his television model XYZ").

Figure 7:
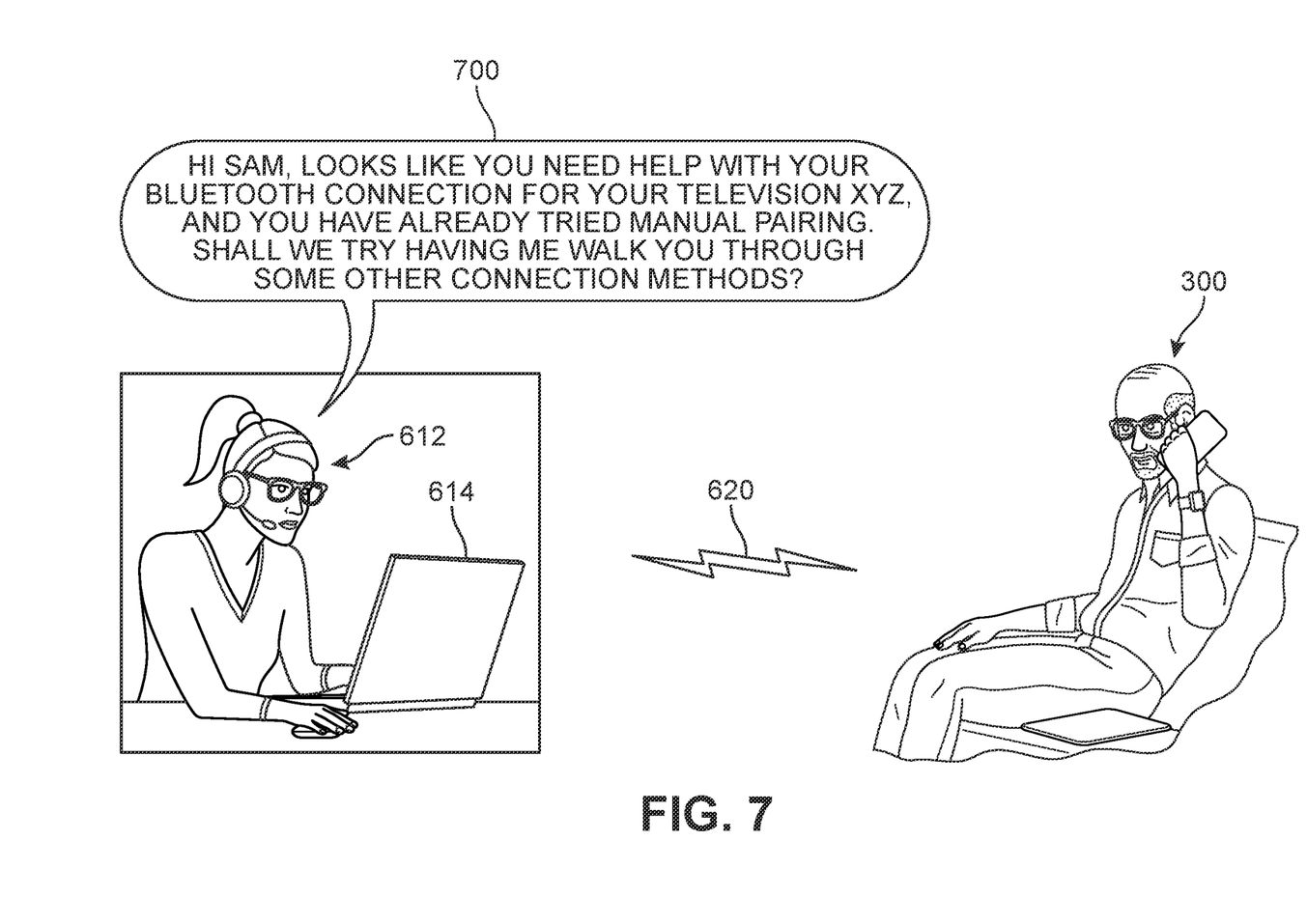
FIG. 7 is an illustration of the support agent of FIG. 6 acknowledging the customer's issue based on the customer's recent activity and providing a solution, according to an embodiment.

In some embodiments, before beginning her conversation with the second customer 300, the support representative 612 is able to quickly and easily familiarize herself with the reason for the call by reviewing report 600. In addition, the report 600 can remain on her screen while she communicates with second customer 300. Thus, as shown in FIG. 7, as soon as the connection with second customer 300 and support representative 612 is initiated, rather than beginning by reciting a series of questions about the customer, the customer's account, the issue, the product, and/or what the customer has already attempted, the support representative 612 is able to represent a continuation of the customer's search for guidance. In other words, from the customer's point of view, the support experience comprises a substantially single event session, flowing easily between the in-app search and the subsequent call with the support agent, rather than two discrete event sessions in which the customer must engage in repetitive interactions.

In FIG. 7, the support representative 612 responds to the call with the second customer 300 by quickly summarizing the reason for the call herself (without requiring the customer to explain the context for the call), acknowledging the solution already attempted by the customer, and moving smoothly into alternate solutions. For example, in this case the support representative 612 recites, "Hi Sam, looks like you need help with your Bluetooth connection for your television XYZ, and you have already tried manual pairing. Shall we try having me walk you through some other connection methods?") in her introduction 700. In other embodiments, there may be some other introductory remarks, or the second customer 300 may reiterate his difficulty in activating the speaker system 320, but essentially the representative is able to steer the conversation without hesitation or circuitous remarks or questions, while the customer experiences the peace of mind of a minimal hassle and expeditious support experience.

Figure 8:
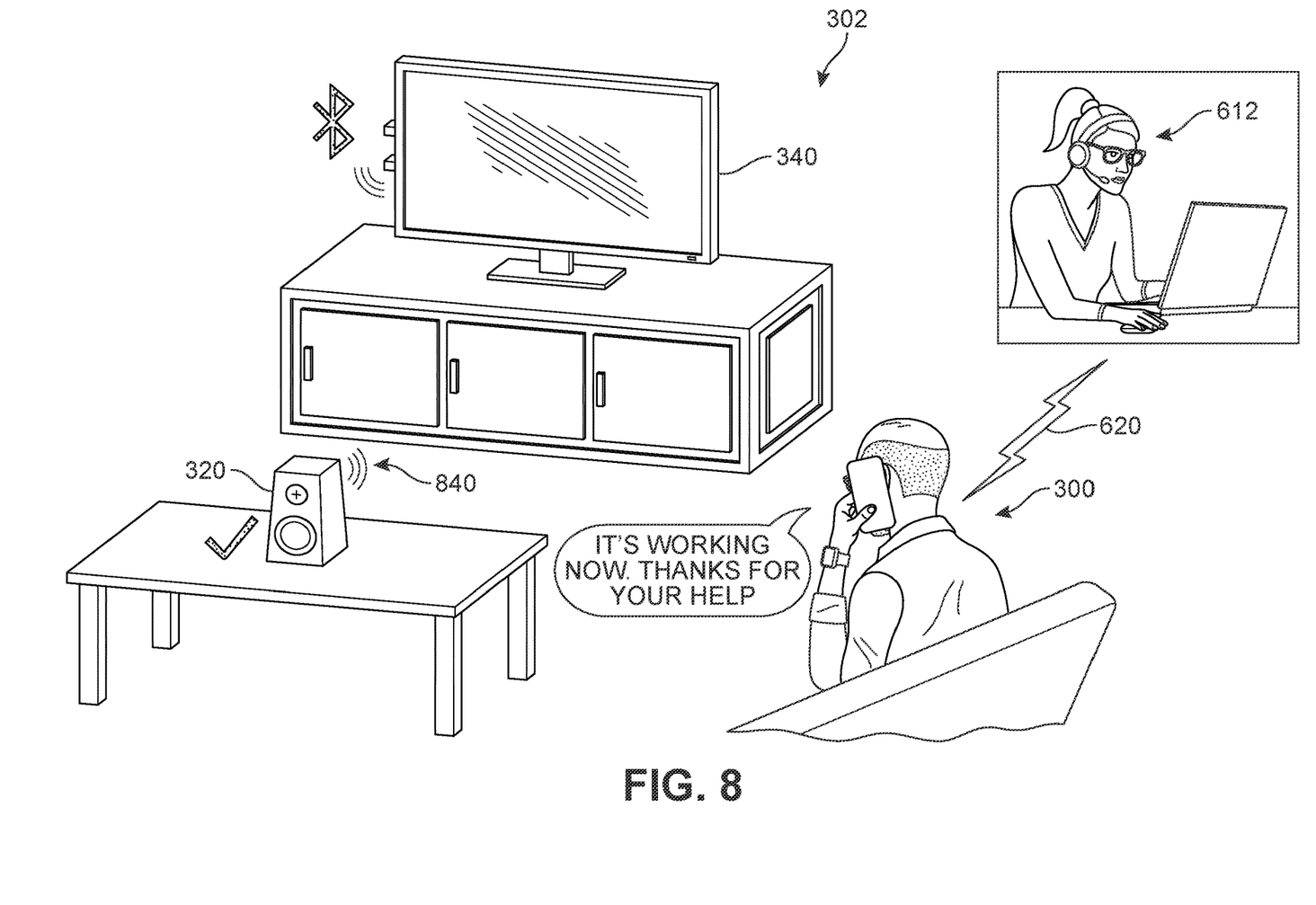
FIG. 8 is an illustration of a customer successfully solving their issue based on the information received from the support agent, according to an embodiment.

An example of a resolution is represented in FIG. 8, where support representative 612 has walked the second customer 300 through an alternate troubleshooting process. As a result, the speaker 320 is successfully paired with television 340, and customer happily expresses his thanks ("It's working now. Thanks for your help."). No further interaction is necessary for the situation, and the customer can return to his enjoyment of the product/service. Once the questions from the second customer 300 have been addressed, either the support representative 612 or second customer 300 can conclude the communication session. In some embodiments, as discussed in FIG. 2, feedback can be received by the support agent (or customer), that will be conveyed to the intelligent guidance system for further refinement of the model.

Figure 9:
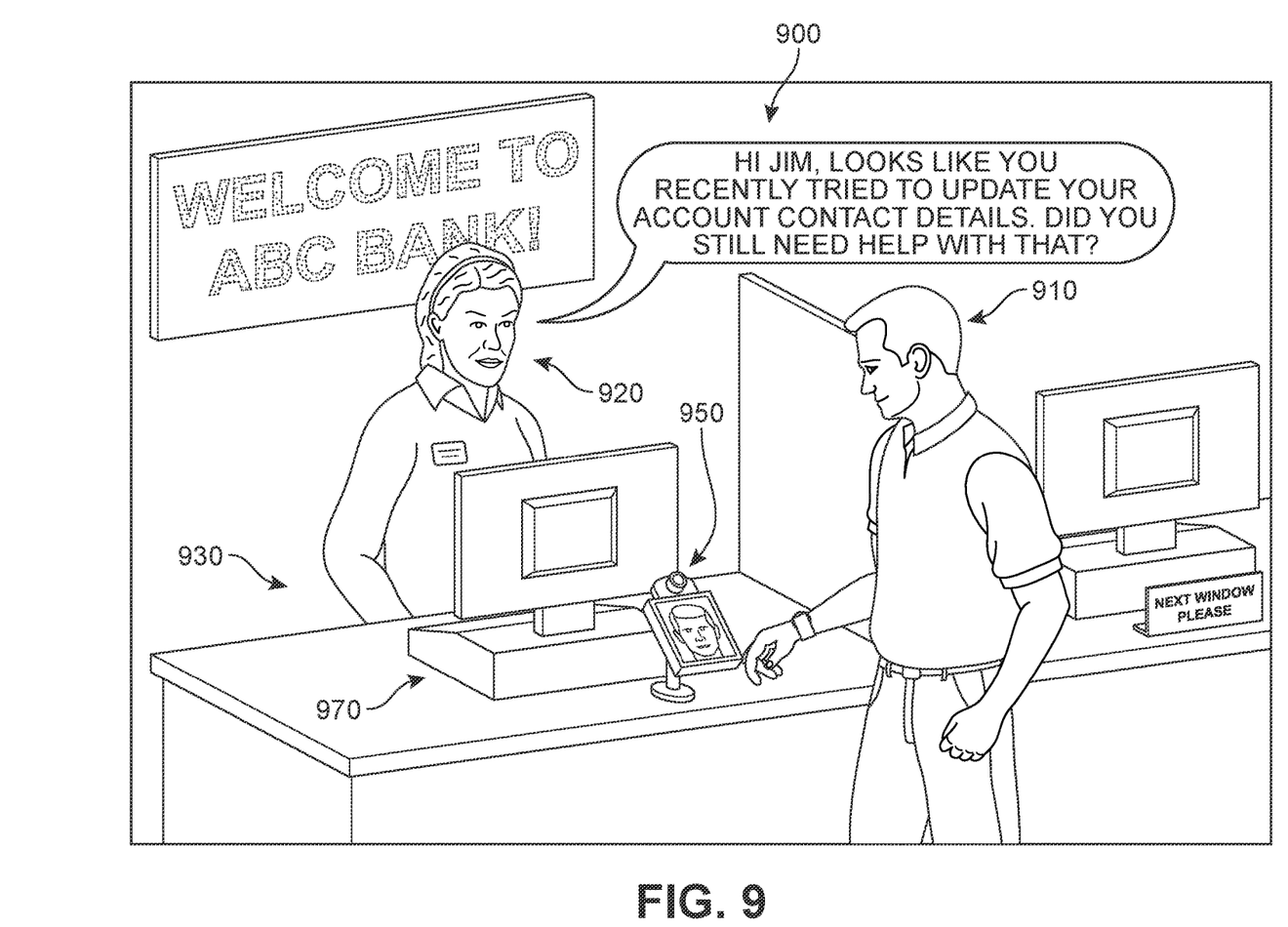
FIG. 9 is an illustration of a customer approaching an in-person customer service station in order to receive support for their account, according to an embodiment.

An alternate example of the proposed embodiments is depicted with respect to FIG. 9 in which the support experience occurs in person rather than remotely. In this case, a third customer 910 ("Jim") had earlier attempted to make changes to his account through the app for the entity "ABC Bank". At a subsequent time, as shown in FIG. 9, the third customer 910 approaches a service counter 930 for the ABC bank entity. The third customer 910 logs in or otherwise provides an identifier factor to allow an entity computing system 970 to authenticate the third customer 910 and retrieve his account information. In some embodiments, the system 970 can further retrieve recent activity for the customer, and determine if there were one or more processes or interactions that the customer had aborted or otherwise remained incomplete. In this example, an entity employee 920 is automatically presented the in-app user activity, and is able to welcome third customer 910 with a personalized message 900 ("Hi Jim, looks like you recently tried to update your account contact details. Did you still need help with that?"). The third customer 910 can be transitioned smoothly into completion of an issue that he had struggled with, and the employee 920 is able to resolve the issue with minimal time expenditure and very little burden on the customer.

Figure 10:
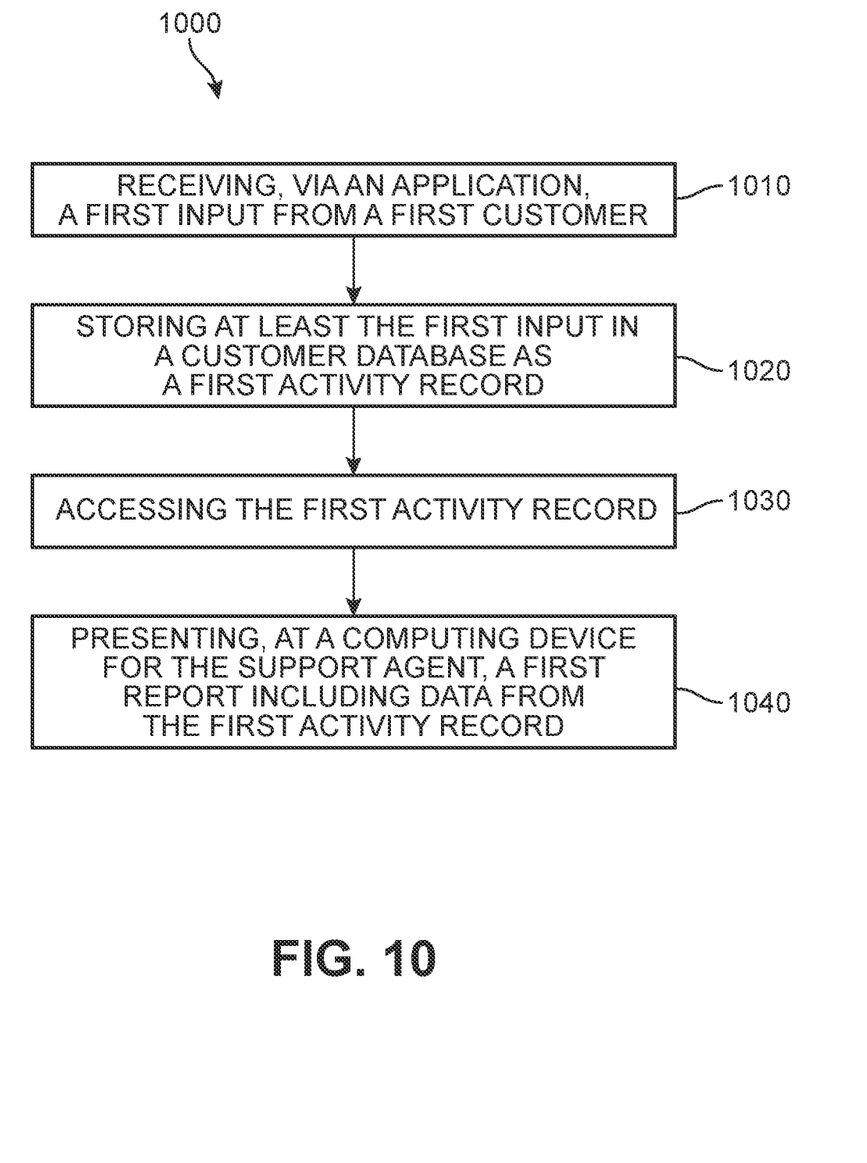
FIG. 10 is a flow diagram of a process for providing assistance to a customer with reference to an automatically generated summary of the customer's recent activity, according to an embodiment.

FIG. 10 is a flow chart illustrating an embodiment of a method 1000 for facilitating customer support experiences by presenting customer-specific information to a support agent. The method 1000 includes a first step 1010 of receiving, via an application, a first input from a first customer, and a second step 1020 of storing at least the first input in a customer database as a first activity record. A third step 1030 includes accessing, in response to a request for a communication session between the first customer and a support agent, the first activity record, and a fourth step 1040 includes presenting, at a computing device for the support agent, a first report including data from the first activity record. In some embodiments, the presentation can occur automatically (e.g., in response to the initiation of a communication session with said customer) or in response to a request by the support agent for such a presentation.

In other embodiments, the method may include additional steps or aspects. In one embodiment, the first customer has a first customer account through which access to the application occurs, and the first activity record is associated with the first customer account. In another example, the first activity record corresponds to a first period of in-app activity by the first customer. In some embodiments, the first input corresponds to data about a product or service provided by an entity associated with the support agent. In one example, the application is provided as a tool for use by customers of an entity associated with the support agent. In some cases, some or all of the data comprising first report is rendered in natural language format, for example, following processing by a natural language generator. In some other embodiments, the method can include an additional step of presenting, at the computing device, a first recommended solution generated by an intelligent recommendation model based in part on data from the first activity record.

In another embodiment, the storage of at least the first input occurs prior to the request for a communication session (e.g., automatically during the customer in-app session), while in other embodiments, the storage of at least the first input occurs in response to the request for a communication session. In some embodiments, the request for the communication session is submitted by the first customer via the application, while in other embodiments, the request corresponds to a telephone call from the customer to a customer support call center. In one embodiment, the first activity record corresponds to the most recent period of in-app activity for the first customer account. In one example, the first input includes a description of a first issue for which a solution is being sought by or is of interest to the customer.

Other methods can also be contemplated within the scope of this disclosure. For example, a method for providing customer-specific intelligent recommendations to a support agent is disclosed. This method comprises a first step of receiving, via an application, a first input from a first customer describing a first issue for which a solution is being sought, and a second step of storing at least the first input in a customer database as a first activity record. The method also includes a third step of determining, via an intelligent recommendation model, at least a first recommended solution to the first issue based in part on data from the first activity record, and a fourth step of presenting the first recommended solution at a computing device for a support agent in response to a request for a communication session between the first customer and a support agent.

In other embodiments, this method may include additional steps or aspects. In one embodiment, the method also involves steps of accessing, in response to the request for a communication session between the first customer and a support agent, the first activity record, and then presenting, at a computing device for the support agent, a first report including data from the first activity record. In another example, the first customer has a first customer account through which access to the application occurs, and the first activity record is associated with the first customer account. In some embodiments, the first activity record corresponds to the most recent period of in-app activity for the first customer account. In one example, the first input corresponds to data about a product or service provided by an entity associated with the support agent. In another embodiment, the application is provided as a tool for use by customers of an entity associated with the support agent. In some cases, the request for the communication session is submitted by the first customer via the application.

Thus, as described herein, the proposed systems and methods provide a mechanism by which both customers and support agents can bypass the traditional process (e.g., a series of questions and answers) of bringing the support agent "up to speed" regarding the customer's account and reason for calling. This process is time-consuming and often frustrating for the customer, who has often already attempted to address the issue themselves, and may even be contacting the support agent due to difficulties navigating within the entity's app. The proposed embodiments greatly expedite the interaction by having the user's previous in-app interactions (directly leading up to their call to the agent) be automatically logged and summarized. When the customer calls the support agent, the summary is uploaded for viewing by the support agent, thereby reducing the burden on the customer to explain the issue, the purpose of their call, and/or having to recite their member/customer account details. In some cases, the summary can be automatically invoked and presented on the agent's display when the agent is connected to the customer. The system takes advantage of application data describing the member's in-app activity, thereby supporting an augmented call experience. Such a system reduces the service time needed to address the customer's issues, while also improving the quality of the customer's overall call experience. In addition, the resolution(s) ultimately implemented by the agent and customer can be recorded and used to improve future app experiences that are directed to the same issue(s). In some cases, the solution can be used by the system to determine whether the app operation flow associated with the issue should be updated. In another example, a machine learning algorithm can evaluate the summary of the user experience prior to hand-off to an agent and automatically generate one or more recommendations for resolving the customer's issue. These recommendations can be conveyed to the support agent as a type of smart guidance, allowing the agent to proceed directly to addressing the concerns of the customer.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for improving customer support electronic communication systems by presenting customer-specific information to a support agent, the method comprising:

receiving, via an application on a mobile computing device, a first input from a first customer describing a first issue for which a solution is being sought, the first input being inputted into the mobile computing device through a touchscreen on the mobile computing device;

storing at least the first input in a customer database as a first activity record;

accessing by an intelligent guidance system, in response to a request for a communication session between the first customer and a support agent, the first activity record;

determining, via a machine learning algorithm that is part of the intelligent guidance system, at least a first recommended solution to the first issue;

the machine learning algorithm being configured to improve recommended solutions it generates over time by using as inputs the first activity record, data received from the customer database describing past attempts by the first customer to resolve the first issue for which a solution is sought, data received from a solutions database, feedback received from the support agent upon termination of a previous communication session between the support agent and a previous customer regarding whether a previous recommended solution was successful in addressing the previous customer's issue for which a solution was being sought, data from an electronic repository of previous communication sessions and customer records, and feedback received from the first customer regarding whether a recommended solution was successful in addressing the first customer's first issue for which a solution is being sought;

presenting, at a computing device associated with the support agent, a first report including data from the first activity record and a description of the first recommended solution;

the support agent choosing not to implement the first recommended solution with the first customer and instead disregarding the first recommended solution; and the support agent requesting that the machine learning algorithm generate a second recommended solution as an alternative next-best solution to the first recommended solution that was disregarded;
wherein the machine learning algorithm further uses as an input for improving recommended solutions it generates over time the disregarding of the first recommended solution by the support agent.

2. The method of claim 1, wherein the first customer has a first customer account through which access to the application occurs, and the first activity record is associated with the first customer account.

3. The method of claim 1, wherein the first activity record corresponds to a first period of in-app activity by the first customer.

4. The method of claim 1, wherein the first input corresponds to data about a product or service provided by an entity associated with the support agent.

5. The method of claim 1, wherein the application is provided as a tool for use by customers of an entity associated with the support agent.

6. The method of claim 1,
wherein the step of accessing the first activity record by the intelligent guidance system includes the first activity record being stored in symbols or other non-dialogue text, and a natural language generation module converting the first activity record into a natural language response; and
wherein the step of presenting the first report at a computer device associated with the support agent includes presenting the natural language response generated by the natural language generation module.

7. The method of claim 1, wherein the first report is rendered in natural language format.

8. A method for improving customer support electronic communication systems by presenting customer-specific intelligent recommendations to a support agent, the method comprising:
receiving, via an application on a mobile computing device, a first input from a first customer describing a first issue for which a solution is being sought, the first input being inputted into the mobile computing device through a touchscreen on the mobile computing device;
storing at least the first input in a customer database as a first activity record;
determining, via a machine learning intelligent recommendation model, at least a first recommended solution to the first issue;
wherein the first recommended solution is based in part on data from the first activity record, data received from a solutions database, data received from the customer database describing past attempts by the first customer to resolve the first issue for which a solution is sought, and data from an electronic repository of previous communication sessions and customer record;
wherein the machine learning intelligent recommendation model is configured to improve recommended solutions it generates over time by receiving as inputs
feedback received from the support agent regarding whether the first recommended solution is accepted or disregarded,
feedback received from the support agent upon termination of a previous communication session between the support agent and a previous customer regarding whether a previous recommended solution was successful in addressing the previous customer's issue for which a solution was being sought,
feedback received from the first customer regarding whether a recommended solution was successful in addressing the first customer's first issue for which a solution is being sought; and
presenting the first recommended solution at a computing device for a support agent in response to a request for a communication session between the first customer and a support agent;
the support agent choosing not to implement the first recommended solution with the first customer and instead disregarding the first recommended solution; and
the support agent requesting that the machine learning algorithm generate a second recommended solution as an alternative next-best solution to the first recommended solution that was disregarded;
wherein the machine learning algorithm further uses as an input for improving recommended solutions it generates over time the disregarding of the first recommended solution by the support agent.

9. The method of claim 8, further comprising:
accessing, in response to the request for a communication session between the first customer and a support agent, the first activity record;
wherein the first activity record is stored in symbols or other non-dialogue text, and accessing the first activity record includes a natural language generation module converting the first activity record into a natural language response; and
presenting, at a computing device for the support agent, a first report including data from the first activity record that includes the natural language response generated by the natural language generation module.

10. The method of claim 8, wherein the first customer has a first customer account through which access to the application occurs, and the first activity record is associated with the first customer account.

11. The method of claim 10, wherein the first activity record corresponds to the most recent period of in-app activity for the first customer account.

12. The method of claim 8, wherein the first input corresponds to data about a product or service provided by an entity associated with the support agent.

13. The method of claim 8, wherein the application is provided as a tool for use by customers of an entity associated with the support agent.

14. The method of claim 8, wherein the request for the communication session is submitted by the first customer via the application.

15. A system for presenting customer-specific information to a support agent, the system comprising a processor and machine-readable media including instructions which, when executed by the processor, cause the processor to:
receive, via an application on a mobile computing device, a first input from a first customer describing a first issue for which a solution is being sought, the first input being inputted into the mobile computing device through a touchscreen on the mobile computing device;
store at least the first input in a customer database as a first activity record;
access by a machine learning algorithm, in response to a request for a communication session between the first customer and a support agent, the first activity record;
determine, using the machine learning algorithm, at least a first recommended solution to the first issue;

wherein the machine learning algorithm is configured to improve recommend solutions it generates over time by using as inputs the first activity record, data received from the customer database describing past attempts by the first customer to resolve the first issue for which a solution is sought, data received from a solutions database, feedback received from the support agent upon termination of a previous communication session between the support agent and a previous customer regarding whether a previous recommended solution was successful in addressing the previous customer's issue for which a solution was being sought, data from an electronic repository of previous communication sessions and customer records, and feedback received from the first customer regarding whether a recommended solution was successful in addressing the first customer's first issue for which a solution is being sought;

present, at a computing device associated with the support agent, a first report including data from the first activity record and a description of the first recommended solution;

the support agent choosing not to implement the first recommended solution with the first customer and instead disregarding the first recommended solution; and the support agent requesting that the machine learning algorithm generate a second recommended solution as an alternative next-best solution to the first recommended solution that was disregarded;

wherein the machine learning algorithm further uses as an input for improving recommended solutions it generates over time the disregarding of the first recommended solution by the support agent.

16. The system of claim 15, wherein the first customer has a first customer account through which access to the application occurs, and the first activity record is associated with the first customer account.

17. The system of claim 15, wherein the first activity record corresponds to a first period of in-app activity by the first customer.

18. The system of claim 15, wherein the first input corresponds to data about a product or service provided by an entity associated with the support agent.

19. The system of claim 15, wherein the application is provided as a tool for use by customers of an entity associated with the support agent.

20. The system of claim 15, wherein accessing the first activity record by the machine learning algorithm includes the first activity record being stored in symbols or other non-dialogue text, and a natural language generation module converting the first activity record into a natural language response; and wherein presenting the first report at a computer device associated with the support agent includes presenting the natural language response generated by the natural language generation module.

* * * * *